Figure 1:
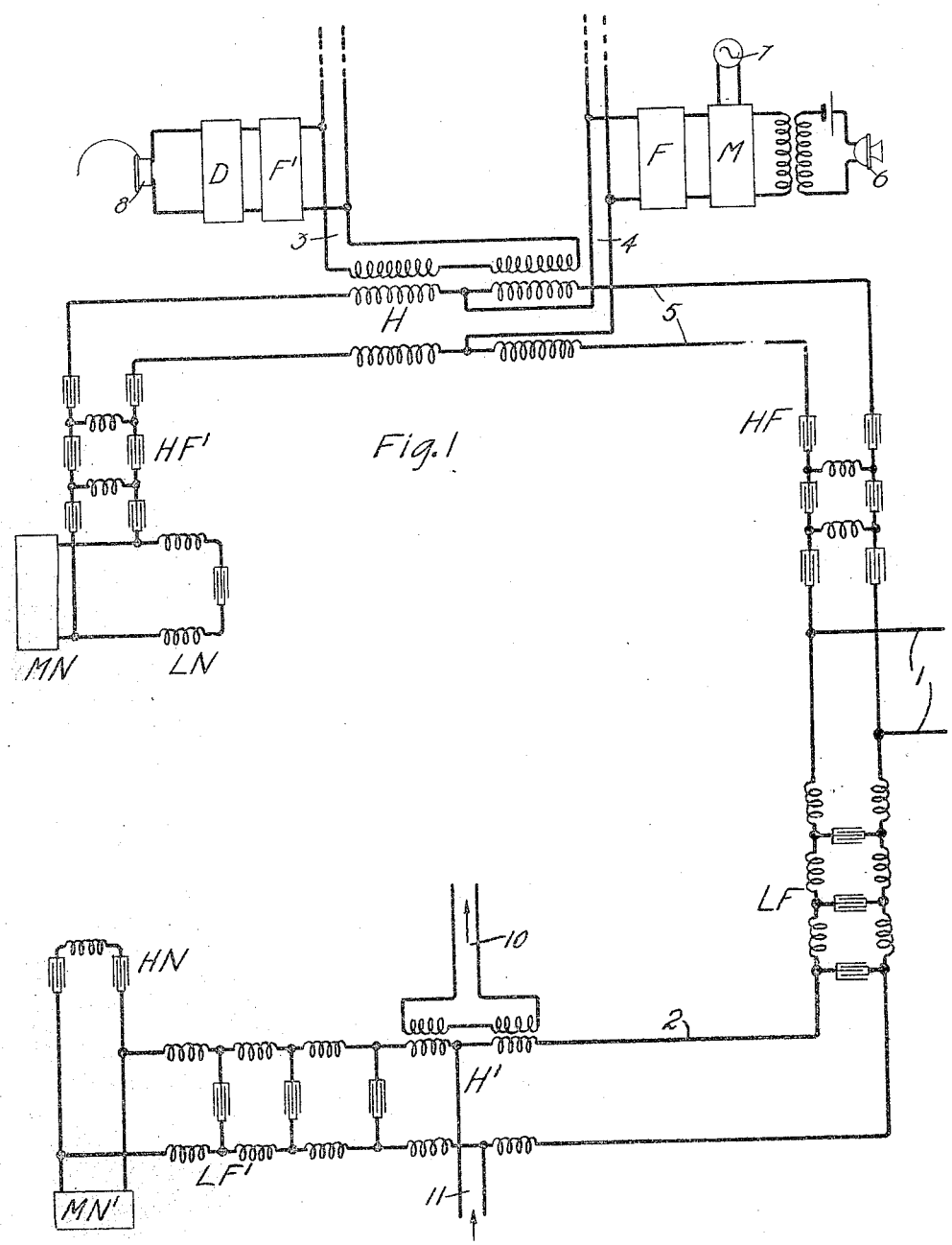

Oct. 23, 1923.

H. J. VENNES 1,471,636

ARTIFICIAL LINE

Filed Aug. 24, 1920     2 Sheets-Sheet 2

Inventor:
Harald J. Vennes.
by C. C. Sprague. Atty.

Patented Oct. 23, 1923.

1,471,636

UNITED STATES PATENT OFFICE.

HARALD J. VENNES, OF NEW YORK, N. Y., ASSIGNOR TO WESTERN ELECTRIC COMPANY, INCORPORATED, OF NEW YORK, N. Y., A CORPORATION OF NEW YORK.

ARTIFICIAL LINE.

Application filed August 24, 1920. Serial No. 405,640.

*To all whom it may concern:*

Be it known that I, HARALD J. VENNES, a citizen of the United States, residing at New York, in the county of New York, State of New York, have invented certain new and useful Improvements in Artificial Lines, of which the following is a full, clear, concise, and exact description.

The present invention relates to the transmission of currents of different frequencies for signaling or other purposes.

More particularly the invention relates to arrangements for supplying currents of different frequencies to a common transmission circuit and for distributing these different frequency currents from the common circuit to individual circuits associated therewith.

In composite systems for signal transmission and particularly in carrier current transmission, the same main line is used to simultaneously convey currents of a number of frequencies for different purposes. In such systems it is necessary to separate the currents of the different frequencies in order to utilize them for their intended purposes and it is also necessary to impress them separately on the main line for transmission. For this purpose branch or extension circuits are connected to the main line and filters may be placed in the respective branches to transmit currents of the frequencies employed by said branches. It frequently becomes necessary to connect to said branches mutually neutral circuits to enable currents to be impressed on and received from a branch circuit but to prevent the impressed currents from entering the receiving circuits. These mutually neutral circuits usually employ a conjugate or hybrid coil with a balancing network having impedance characteristics simulating those of that part of the system lying to the other side of the hybrid coil from that on which the network is placed. In a complex system the network must be complex also, and for accurate balance it has heretofore been considered necessary that the network contain not only a duplicate of such filters of the system as transmit the frequencies employed in the branch containing the network, but also duplicates of other filters associated with the branch but not serving to transmit the frequencies employed by said branch. A network of this general character is disclosed in the application of H. S. Osborne, Serial No. 301,433, filed June 3, 1919 and in British Patent 164,242.

It has been found, however, that in accordance with the present invention the network heretofore employed can be simplified by substituting for certain of the filters a much simpler circuit such as a duplicate of a single section only of the filter. This results in a great economy of filter elements and provides a network substantially equivalent for all practical purposes to the more complicated circuits hereinbefore used.

Figure 2:
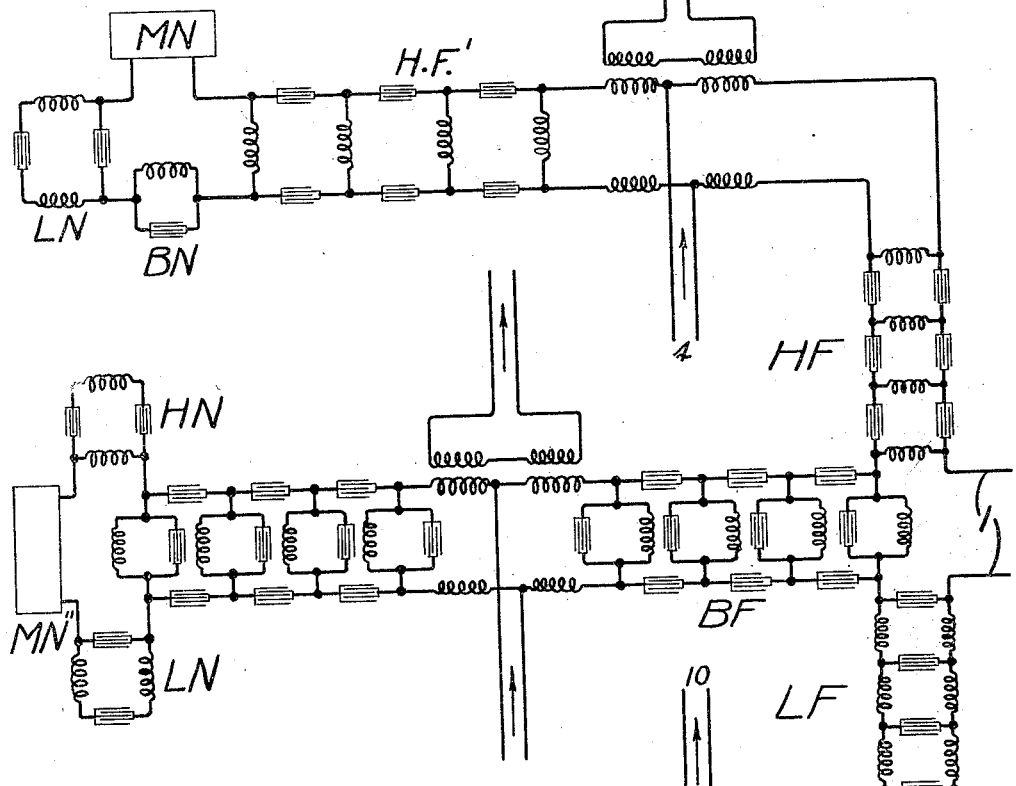
Figure 3:
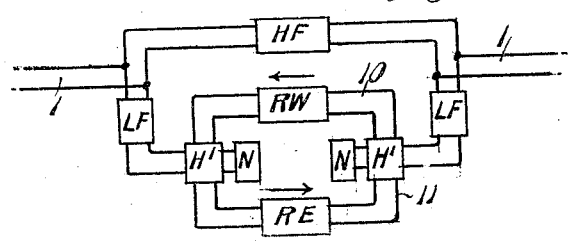

The exact nature and objects of the invention will be more fully understood from the following detailed description read in connection with the drawing, in which Figs. 1, 2 and 3 show typical embodiments of the invention in a carrier frequency composite system.

In Fig. 1, the line 1 is a main line which may be arranged to simultaneously transmit telephone currents and currents of carrier frequencies. Currents of still other frequencies, such as Morse telegraph currents, may also be transmitted over the line at the same time by providing the usual composite sets. The circuit shown in Fig. 1 represents the terminal connections between the carrier branch the low frequency channel and the line 1. For separating the currents of carrier frequencies from those of telephone frequencies and still lower frequencies which may be present, two filters HF and LF are connected in parallel to the line 1. These filters are preferably complex circuits comprising a plurality of sections each made up of inductance and capacity elements. They may, therefore, be termed multi-section filters. The filter LF is a low pass filter; that is, it is so designed as to transmit with uniform small attenuation currents of all frequencies lower than a preassigned cut-off frequency but to highly attenuate and substantially exclude currents of all frequencies higher than the cut-off frequency. This filter, therefore, permits the lower frequency currents to be transmitted freely to the circuit 2 which may be merely an extension of the line 1 and may lead to low frequency signaling apparatus at a distant station or at the same station. The filter HF is a high pass filter designed to transmit freely currents of all frequencies higher than a preassigned lower limit but to substantially prevent the transmission of currents of frequencies lower than the preassigned limit. For information as to the construction and design of filters of this type, U. S. Patent No. 1,227,113, issued May 22, 1917, to G. A. Campbell may be consulted.

Connected to the terminals of the filter HF is the carrier frequency branch 5 containing a hybrid coil H to enable currents of carrier frequencies to be simultaneously received from and impressed on the circuit 5. Bridged across the mid points of the hybrid coil is a branch 4 shown as a transmitting branch, and coupled serially to the windings of the hybrid coil is a branch 3 shown as a receiving branch. In practice, a number of transmitting sets are connected to the transmitting branch 4 and a corresponding number of receiving sets are connected to the branch 3, each transmitting set and each receiving set being adapted to use current of a different frequency. Only a single transmitting set and a single receiving set are shown for the purpose of illustration, however. The transmitting set is shown as comprising a microphone transmitter 6 which is coupled to the modulator M, the modulator being supplied with a high frequency wave from the source 7. By the well-known action of the modulator, the high frequency or carrier wave from the source 7 has its amplitude varied in accordance with speech waves directed against the microphone 6, and for purposes of selection the modulated high frequency wave exhibits the characteristics of currents of a band of high frequencies. The modulated wave is transmitted to the transmitting branch 4 through a band filter F, which, in practice, is of the well known type disclosed in the Campbell patent above referred to, and is so designed as to transmit freely currents of the frequencies represented by the modulated wave from the modulator M but to prevent the transmission in either direction of currents of other frequencies. Other transmitting sets which may be assumed to be connected to the branch 4 employ currents of different high frequencies and have respective filters designed to transmit currents of those frequencies so that mutual interference between respective high frequency channels is prevented. The receiving set connected to the receiving branch 3 comprises a band filter F' for selectively conveying from the receiving branch 3 only currents of those frequencies which represent the message to be received by this particular set. The detector D acts upon the modulated high frequency wave selected by the filter F', and, in the well-known way, renders the low frequency or signal component of the modulated wave receivable in the telephone receiver 8. Other receiving sets may be connected in similar manner to the receiving branch 3 and may be arranged to utilize different frequencies.

It is essential to the successful operation of the high frequency sets that the wave or waves impressed on the branch 4 by the transmitting sets shall not re-enter the branch 3 and so be received by the corresponding receiving sets. In practice, the filters F and F' and the frequencies of the waves used by the corresponding transmitting and receiving sets may be the same or may be different, but if any considerable number of high frequency channels are to be employed, the frequencies of the currents used to receive cannot be widely different from those used to transmit, and it is necessary, therefore, to have a high degree of neutrality between the branches 3 and 4. This necessitates the use of a balancing network connected to the opposite terminals of the hybrid coil from those to which the line is connected, and the net must simulate to a high degree of accuracy the impedance characteristics of the system lying on the line side of the hybrid coil for currents of the particular frequencies present in the branch 5. The net work is illustrated as comprising a filter HF', which should be a duplicate of the filter HF, a main net MN connected to the terminals of the filter HF', and a filter section LN, connected to the terminals of the filter HF'. The net MN simulates the impedance characteristics of the main line 1. At the point where the circuit LN is indicated, it has been customary to employ a filter which is the duplicate of the low frequency filter LF and a network which simulates the impedance of the low frequency line 2. According to the present invention the simplified circuit LN, which is in reality a substantial duplicate of a single section of the filter LF, is used. This has been found in practice to give practically the same degree of balance as is obtained by the use of a complete filter similar to LF together with balancing network for line 2, and since the greater portion of the filter may be omitted, this results in a very substantial saving of coils and condensers.

Referring now to the low frequency channel, a somewhat similar circuit arrangement is shown, except that the network in this case balances the system for the low frequency currents instead of for currents of the high frequencies. The circuit of this channel would be useful, for instance, at a repeater station for the voice currents or other low frequency currents transmitted over the line 1. If the repeater handles only currents of voice frequencies for instance, it is necessary to separate and to by-pass the high frequencies. For this purpose the filter HF is connected between the sections of line 1 as indicated in Fig. 3 and serves to transmit the currents of high frequencies or carrier frequencies in both directions around the repeater station. The repeater station is indicated as comprising an amplifying repeater RW for repeating conversations in a westward direction, and a repeater RE for repeating in an eastward direction. The hybrid coils for balancing the line 1 for the conversational frequencies are diagrammatically indicated at H' H' and the corresponding networks are indicated at N, N. These hybrid coils and networks may be duplicates, and their actual construction is more fully indicated in Fig. 1. The currents of low frequencies pass through the low frequency filter LF to the hybrid coil H'. Coupled to the hybrid coil is a branch 10, which leads to the input circuit of the repeater RW, and the branch 11 leads from the output side of the repeater RE, branch 11 being bridged across the mid points of the hybrid coil.

For balancing this system for currents of the frequencies transmitted by the filter LF to enable two-way transmission of the low frequency currents without producing singing at the repeater, the network, shown to the left of the hybrid coil, is employed. This network comprises a filter LF', which is a duplicate of the filter LF, a main net MN' connected to the terminals of LF' and simulating the impedance of the line 1 at the frequencies transmitted by the filter LF, and a circuit HN. The elements of HN comprise the substantial duplicate of a single section of the filter HF. By the use of the single section HN in place of an entire filter HF and the usual network for balancing the circuit associated with filter HF at the low frequency, it has been found possible to obtain the necessary balance at the hybrid coil H'.

The nature of the nets MN and MN' is not indicated in the drawing but these networks are preferably of the usual type and are comparatively simple. For instance the net MN for balancing the line 1 for currents of high frequency may, in practice, comprise a pure resistance. The net for balancing the line for currents of the lower frequencies may be more complex but it is not necessary that these nets should be any different due to the simplification of the circuit caused by the substitution of the single section LN or HN in place of a complete filter.

It may be stated by way of example, that by actual measurements it was found that the impedance of the networks as a whole in Fig. 1, as seen from the terminals of the filter HF' adjacent to the hybrid coil, was only from 1 to at most 3 or 4 per cent different from the impedance when a complete low frequency filter LF' was used in place of the section LN as shown. This is of the order of the accuracy of balance obtained in practice between the circuits 3 and 4. If neither the duplicate filter LF' nor the terminal section LN was present in the network, the impedance measured under similar conditions was 20 to 40 per cent different from the impedance of the circuit as shown. Measurements on the circuit of the low frequency channel gave similar results. In these measurements the filter LF had a cut-off frequency of about 2500 cycles and the filter HF had a cut-off frequency of about 5000 cycles and the different values given are, respectively for the highest of the low frequency range and the lowest of the high frequency range. That is, the impedance measurements on the circuit of Fig. 1 were made at a frequency of about 5000, while the measurements on the circuit of Fig. 2 were made at a frequency of about 2500. If the impedance measurements of the high frequency circuit in Fig. 1 were made for a much higher frequency, such as 10,000 or 20,000 cycles, there would be a much smaller impedance difference due to the use of the circuit LN in place of an entire filter LF' probably only a fraction of one per cent.

The reason that the network using the single section LN exhibits so nearly the impedance characteristics of the network when an entire filter LF' is used, is probably due to the fact that the only frequency currents that reach the network are those transmitted by the high pass filter HF, and these being entirely outside the transmission range of the low pass filter LF meet with a very high impedance, whichever circuit LF' or LN is used.

The filters FL and HF of Fig. 1 are each shown as having the equivalent of two sections, each terminating section being a half section. For purposes such as those in the system shown, this is considered in practice a minimum number of sections and more sections may be necessary in some cases.

In Fig. 2 there is illustrated an arrangement in which three channels are connected to line 1, the various filters having their terminal sections connected in series with respect to this line instead of in parallel as in Fig. 1.

As shown, a high frequency channel is connected to line 1 by a high pass filter HF and this channel may be in every respect similar to that of Fig. 1, except in the manner of the high frequency filter connection and the balancing arrangements. A low frequency channel similar to that of Fig. 1 is likewise connected to line 1 by a low pass filter LF. A third channel adapted to pass currents of a band of frequencies lying between the cut-off points of the filters HF and LF is connected to line 1 by a band filter BF which has an upper cut-off frequency below the cut-off of filter HF and a lower cut-off frequency above the cut-off of filter LF.

The arrangement of Figure 2, as far as described, differs from that of Figure 1 principally in that the various channels are connected to the line 1 by filters having their end sections in series with respect to the line. Since each of these end sections must serve in series with the line as a conductor for the currents of such frequencies as are selected by the other two filters, the termination of each filter is made of low impedance for such currents.

The balancing arrangements may now be considered. In the high frequency channel the filter HF is duplicated at HF'. There remain to be considered the line 1, the low frequency channel, and the band frequency channel. For the line 1 a network MN is used as in Figure 1. For the low frequency channel the network LN simulating the terminal section of the low pass filter LF may be used. For the band frequency channel, a network BN substantially a duplicate of the terminal section of the filter BF is used. The balancing arrangements of the various other channels will be clearly understood without further explanation. The networks MN, MN' and MN'' are the balancing devices for the line.

While the invention has been described with particular reference to a carrier current composite system, it will be clear that, it is also applicable in general to other types of circuits such, for example, as any circuit in which the impedance of a filter or the like is to be simulated for currents of frequencies outside the transmission range of said filter. The scope of the invention is defined in the following claims.

What is claimed is:

1. In a system having a plurality of filters for transmitting currents of different frequencies, each filter comprising a plurality of sections, means for simulating the impedance characteristics of one filter for currents of the frequencies transmitted by another filter comprising a substantial duplicate of a single section of the filter the impedance of which is to be simulated.

2. A network for balancing a pair of multi-section filters of different transmission frequency ranges for currents of the frequencies transmitted by one of said filters comprising a duplicate of the filter through which said currents are transmitted, and a substantial duplicate of a single section of the other filter.

3. In a system employing a plurality of multi-section filters for transmitting currents of respectively different frequencies, a network for balancing said system for currents of the frequencies transmitted by one of said filters including a substantial duplicate of a section of another of said filters for simulating the impedance of said other filter at the frequencies transmitted by the one filter.

4. A balancing network for a system having a high frequency filter connected therein in parallel with a low frequency filter, a network for balancing said system at the frequencies of currents transmitted by one of said filters and comprising a duplicate of the filter through which currents of said frequencies are transmitted and a circuit connected to the terminals of said filter and consisting of a substantial duplicate of one section of the other filter and an impedance element to simulate the impedance of that portion of the system to which said filters are connected in common.

5. In a system comprising a line having a high pass filter and a low pass filter connected thereto in parallel with each other, each filter comprising a plurality of sections and a high frequency circuit connected to the former filter and a low frequency circuit connected to the latter filter, a network for balancing said system for currents of the frequencies transmitted by one of said filters comprising a duplicate of the filter through which said currents are transmitted, a circuit simulating the line connected to the terminals of said duplicate filter, and a circuit in parallel to said line-simulating circuit and duplicate filter consisting of a substantial duplicate of a single section of the other filter.

6. In a system including a line for transmitting currents of a plurality of frequencies, and filters connected thereto in parallel with each other for transmitting respectively currents of different frequencies, each filter comprising a plurality of sections made up of inductance and capacity elements and circuits connected to the respective filters for conveying the currents of the frequencies transmitted by said filters, a network for balancing said system for the currents of the frequencies transmitted by one of said filters comprising a duplicate of the filter through which said currents are transmitted, an impedance element for simulating the impedance of said line at those frequencies and a substantial duplicate of a single section of another of said filters.

7. In a composite system comprising a line for transmitting currents of different frequencies having multi-section filters connected thereto each for transmitting different selected frequency currents and extension circuits connected to the respective filters, the circuit connected to one of said filters containing a hybrid coil for enabling currents to be simultaneously transmitted to and received from said line through said filter, a network connected to the opposite terminals of said hybrid coil for balancing said system at the frequencies transmitted to and from said hybrid coil comprising a filter connected to said hybrid coil the substantial duplicate of the filter connected between the line and said hybrid coil, a circuit simulating the line connected thereto and an impedance also connected thereto substantially the duplicate of a single section of a said filter that is adapted to transmit currents of other frequencies and that is connected to said line.

8. An electrical transmission system comprising a line for transmitting currents of frequencies of a given range and frequencies outside said range, means comprising a multi-section filter connected to said line for transfer of currents of said given range of frequencies, and means for balancing said transfer means for currents of frequencies outside of said range comprising a substantial duplicate of a single section of said filter.

9. In a system for transmitting currents of different frequencies comprising as an element a multi-section filter for transmitting currents of a limited range of said frequencies, a network for matching the impedance characteristics of said system for currents of frequencies outside the range of frequencies transmitted by said filter, said network containing as an element for matching the impedance of said filter a circuit substantially equivalent to the end-section of said filter, electrically the more adjacent to said network.

In witness whereof, I hereunto subscribe my name this 17th day of August A. D., 1920.

HARALD J. VENNES.